(12) United States Patent
Hofmann et al.

(10) Patent No.: US 11,400,948 B2
(45) Date of Patent: Aug. 2, 2022

(54) METHOD FOR CONTROLLING VEHICLE FUNCTIONS

(71) Applicant: Daimler AG, Stuttgart (DE)

(72) Inventors: Hansjoerg Hofmann, Stuttgart (DE);
Daniel Muecke, Boeblingen (DE); Jan Dassler, Kirchheim unter Teck (DE);
Gudrun Schoenherr, Holzgerlingen (DE); Matthias Ulmer, Rottenburg (DE)

(73) Assignee: Daimler AG, Stuttgart (DE)

( * ) Notice: Subject to any disclaimer, the term of this patent is extended or adjusted under 35 U.S.C. 154(b) by 216 days.

(21) Appl. No.: 16/754,647

(22) PCT Filed: Oct. 2, 2018

(86) PCT No.: PCT/EP2018/076708
§ 371 (c)(1),
(2) Date: Apr. 8, 2020

(87) PCT Pub. No.: WO2019/072621
PCT Pub. Date: Apr. 18, 2019

(65) Prior Publication Data
US 2020/0239011 A1    Jul. 30, 2020

(30) Foreign Application Priority Data
Oct. 9, 2017 (DE) ..................... 10 2017 009 353.9

(51) Int. Cl.
*B60W 50/00* (2006.01)
*B60N 2/90* (2018.01)
(Continued)

(52) U.S. Cl.
CPC ......... *B60W 50/0098* (2013.01); *B60K 35/00* (2013.01); *B60N 2/5621* (2013.01);
(Continued)

(58) Field of Classification Search
CPC .. B60W 50/0098; B60W 10/30; B60W 40/08; B60K 35/00; B60K 2370/152;
(Continued)

(56) References Cited

U.S. PATENT DOCUMENTS

| 5,745,031 A | 4/1998 | Yamamoto |
| 8,140,344 B2 | 3/2012 | Kameyama |

(Continued)

FOREIGN PATENT DOCUMENTS

| DE | 10 2006 015 332 A1 | 11/2006 |
| DE | 10 2010 011 319 A1 | 9/2011 |

(Continued)

OTHER PUBLICATIONS

PCT/EP2018/076708, International Search Report dated Feb. 11, 2019 (Three (3) pages).

*Primary Examiner* — Mussa A Shaawat
(74) *Attorney, Agent, or Firm* — Crowell & Moring LLP

(57) ABSTRACT

A method for controlling vehicle functions to increase the well-being and/or to increase the attention of at least one vehicle user in a vehicle. A number of vehicle functions are activated when at least one specific user menu is selected. Here, a lead function assigned to the user menu from the number of vehicle functions is predetermined in each case and the time and content processes of the other vehicle functions assigned to the user menu are coordinated with respect to the lead function.

10 Claims, 1 Drawing Sheet

(51) Int. Cl.
*B60K 35/00* (2006.01)
*B60W 10/30* (2006.01)
*B60W 40/08* (2012.01)
*B60N 2/56* (2006.01)

(52) U.S. Cl.
CPC ........... *B60N 2/5692* (2013.01); *B60N 2/976* (2018.02); *B60W 10/30* (2013.01); *B60W 40/08* (2013.01); *B60K 2370/152* (2019.05); *B60K 2370/157* (2019.05); *B60K 2370/741* (2019.05)

(58) Field of Classification Search
CPC ........ B60K 2370/741; B60K 2370/736; B60K 2370/739; B60K 37/04; B60K 37/06; B60R 16/037
See application file for complete search history.

(56) References Cited

U.S. PATENT DOCUMENTS

| | | | |
|---|---|---|---|
| 10,433,646 B1 * | 10/2019 | Schmidt | A47C 1/143 |
| 2004/0117084 A1 * | 6/2004 | Mercier | B60R 11/02 |
| | | | 307/10.1 |
| 2008/0311983 A1 * | 12/2008 | Koempel | A63F 13/10 |
| | | | 463/31 |
| 2013/0066526 A1 * | 3/2013 | Mondragon | G06V 40/20 |
| | | | 701/49 |
| 2014/0135598 A1 * | 5/2014 | Weidl | A61B 5/48 |
| | | | 600/300 |
| 2014/0221781 A1 * | 8/2014 | Schrauf | B60K 28/06 |
| | | | 600/301 |
| 2014/0309879 A1 * | 10/2014 | Ricci | G06Q 20/321 |
| | | | 701/36 |
| 2016/0159345 A1 * | 6/2016 | Kim | B60W 50/12 |
| | | | 701/36 |
| 2016/0185267 A1 * | 6/2016 | Nah | B60N 2/763 |
| | | | 701/36 |
| 2016/0304013 A1 * | 10/2016 | Wolas | B60N 2/5657 |
| 2017/0001650 A1 * | 1/2017 | Park | B60W 50/08 |
| 2018/0022358 A1 * | 1/2018 | Fung | G06K 9/00536 |
| | | | 701/36 |
| 2018/0052655 A1 * | 2/2018 | Hannibal, III | H04R 29/00 |

FOREIGN PATENT DOCUMENTS

| | | |
|---|---|---|
| DE | 10 2012 013 549 A1 | 1/2013 |
| DE | 10 2011 084 915 A1 | 4/2013 |
| DE | 10 2013 208 347 A1 | 11/2014 |
| DE | 10 2015 105 581 A1 | 5/2016 |
| EP | 2 314 207 A1 | 4/2011 |
| WO | WO 2005/082232 A1 | 9/2005 |
| WO | WO 2014/118467 A1 | 8/2014 |

* cited by examiner

METHOD FOR CONTROLLING VEHICLE FUNCTIONS

BACKGROUND AND SUMMARY OF THE INVENTION

The invention relates to a method for controlling vehicle functions to increase the well-being and/or to increase the attention of at least one vehicle user in a vehicle. Furthermore, the invention relates to a device for carrying out the method and a vehicle having such a device.

A method for determining a driver state of a vehicle is known from DE 10 2012 013 549 A1. Here, a measure for the severity of the inattentiveness and/or fatigue of the driver is determined from sensory data and the driver is given a warning message depending on the measure determined. In addition, the driver is given a number of vitalization measures that can be activated in the vehicle to reduce inattentiveness and/or fatigue for manual selection and/or activation.

The object of the invention is to specify a method, which is improved in comparison to the prior art, for controlling vehicle functions to increase the wellbeing and/or to increase the attention of at least one vehicle user in a vehicle, a device for carrying out the method and a vehicle having such a device.

A method according to the invention for controlling vehicle functions for increasing the well-being and/or for increasing the attention of at least one vehicle user in a vehicle provides that a number of vehicle functions (F1 to Fn) are activated when at least one specific user menu is selected. When selecting a user menu, one of the number of vehicle functions (F1 to Fn) assigned to the user menu is predetermined in each case and the time and content sequences of the other vehicle functions (F1 to Fn) assigned to the user menu are coordinated with respect to the leading function.

By applying the method, the vehicle functions are connected to each other in an intelligent and coordinated manner, whereby an overall experience for a vehicle user and other occupants of the vehicle is created. This overall experience offers a maximum added value from the plurality of the available vehicle functions integrated in the vehicle from special equipment.

Since the vehicle user is preferably offered more than one such user menu to select from, different atmospheres can be represented in the interior of the vehicle, which can be used in particular by the vehicle user, who is a driver of the vehicle, to increase his or her well-being and attention on the one hand and to enjoy the overall experience in the vehicle on the other hand.

In one embodiment, ionization, scenting, seat ventilation, massage, air conditioning, seat heating, ambient light, acoustic output, optical output and/or sound-dependent movement at least of partial regions of a vehicle seat are coordinated in terms of time and content as vehicle functions. Furthermore, the vehicle functions motion seating, surface heating, neck cushions which can be heated or other functions can also be integrated.

Depending on the user menu selected by the vehicle user, a majority of the vehicle functions assigned to the corresponding user menu are combined with each other in order to enhance the well-being, in particular of the vehicle user, and/or to increase attention.

A development of the method provides that at least one seat bubble integrated into a vehicle seat, in particular a driver's seat, is controlled at least for a massage function by music played in sync at the same time. In this way, for example, the attention of the vehicle user can be supported in a targeted manner, since the vehicle user experiences an impulse by means of the time-dependent control. In this way, the risk of a so-called microsleep is reduced.

In a further embodiment of the method, an ambient light is controlled depending on the background color of an animation running on a display unit. The ambient light is adapted to the background color of the display unit, such that the interior is harmoniously illuminated by the display unit and the ambient light, whereby the feeling of relaxation, i.e., the well-being, of the vehicle user can be increased.

In a development, a blower is used to generate an air blast, whereupon an element depicted on a display unit appears to move. Thus a viewer of the display unit is under the impression that the movement of the element results from the air blast, which is preferably generated by a blower of the air conditioning system of the vehicle. In turn, the coordinated interaction of the vehicle functions is thus depicted.

A further possible embodiment of the method provides that a movement speed of an animation depicted on a display unit is set depending on the speed of music played. Here, too, at least these two vehicle functions interact in a coordinated manner, wherein both the well-being and the attention of the vehicle user can be increased.

Furthermore, in the case of flowers depicted on a display unit, a scenting of the interior of the vehicle can be activated. By way of example, a scent corresponding to the depicted flowers can be supplied to the interior, wherein the vehicle user preferably has the option of deactivating the scenting.

The scenting, in particular a correspondingly selected scent, can be used to increase the well-being on the one hand and to increase the attention of the vehicle user on the other hand.

The combinations of the vehicle functions described above are only explained as exemplary embodiments and do not show the whole spectrum of possible and sensible combinations of vehicle functions. It is important that the vehicle user is offered an overall experience in the sense of a staging by means of the combination, intelligent linking and chronological sequence of various vehicle functions suitable for this special purpose.

Further vehicle functions can also be integrated via the vehicle functions explicitly mentioned above.

In particular, a relaxing and calming user menu and an invigorating and activating user menu are offered as a selectable user menu. By way of example, one user menu can be activated if the vehicle user is stressed due to a long working day. The other user menu, in particular to increase attention, can be activated or offered to the vehicle user for activation, for example, during long and monotonous journeys of the vehicle.

In addition, the invention relates to a device for carrying out the method described above and a vehicle having such a device.

By means of the device, the timing and content coordination of the vehicle functions can be implemented, such that an overall experience in the interior of the vehicle can be generated for the vehicle user and, if necessary, for other occupants.

Exemplary embodiments of the invention are explained in more detail in the following using drawings.

DETAILED DESCRIPTION OF THE DRAWINGS

Figure 1:
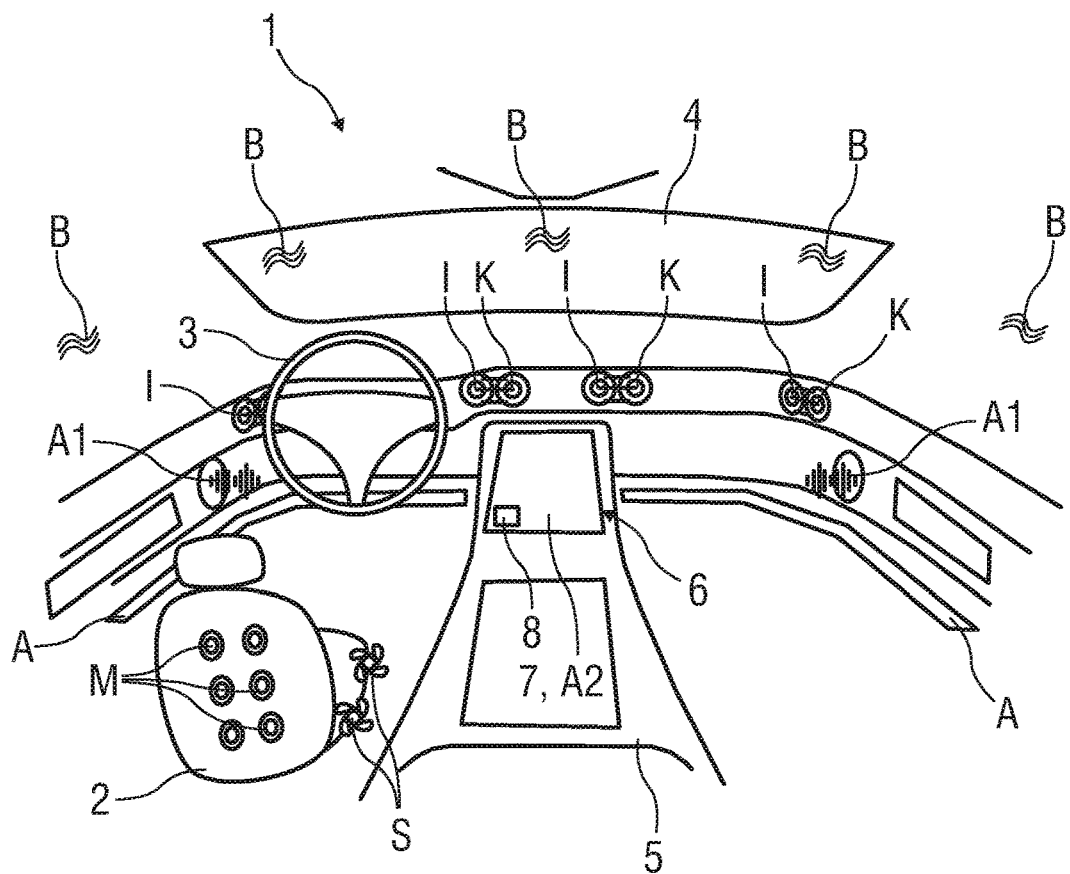
FIG. 1 shows schematically, a cut-out of the interior of a vehicle.

Parts corresponding to one another are provided with the same reference numerals in all Figures.

FIG. 1 shows a perspective view of a cut-out of the interior of a vehicle 1, wherein a vehicle seat 2, a steering wheel 3, a windscreen 4 and a center console 5 are depicted.

Figure 2:
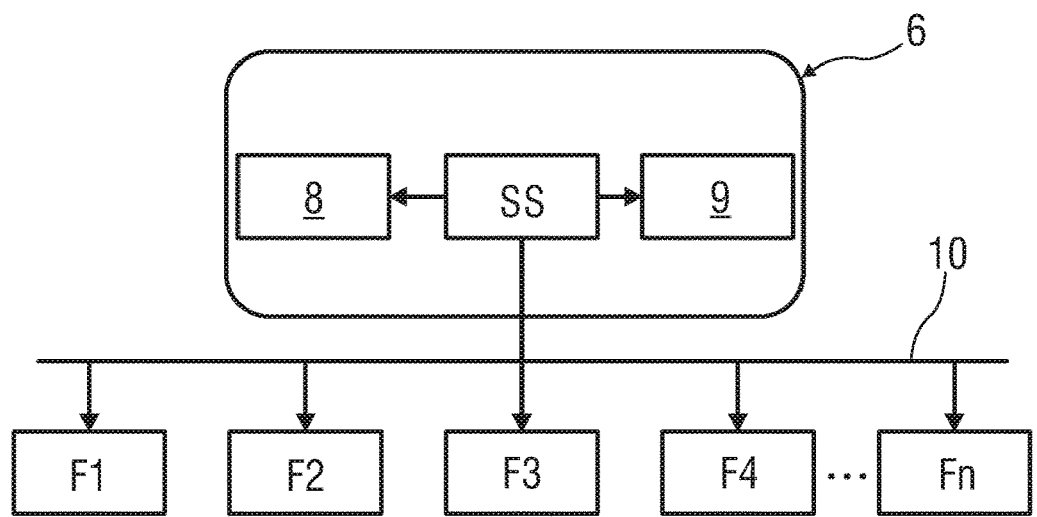
FIG. 2 shows schematically, a device for carrying out a method for controlling the vehicle functions.

The vehicle 1 has a number of vehicle functions F1 to Fn shown in FIG. 2, which can be activated to increase the well-being and/or increase the attention of a vehicle user who is not depicted in more detail.

Here, the vehicle functions F1 to Fn can be activated and deactivated via an on-board computer 6 integrated into the center console 5 with a display unit 7, wherein the on-board computer has at least one control element 8 for this purpose.

Amongst other things, ionisation I, scenting B of the interior, seat ventilation S, massage M, air conditioning K, seat heating, ambient light A, acoustic output A1, optical output A2 by means of the display unit 7 and/or sound-dependent movement of at least partial regions of the vehicle seat 2 in the vehicle 1 are available as activatable vehicle functions F1 to Fn.

In addition, heating of a center console 5 and/or a steering wheel 3 can be present as a vehicle function to F1 to Fn. In addition, the Motion Seating function, surface heating and heated neck cushions can be present as a vehicle function F1 to Fn.

Motion Seating is to be understood here as the function in which the seat back and seat cushion move cyclically back and forth or up and down with relatively low amplitudes. By means of the permanent change of the seating position, cramped sitting during a longer journey should be counteracted.

This plurality of the vehicle functions F1 to Fn is available to the vehicle user, wherein the individual vehicle functions F1 to Fn can be activated and deactivated by means of switches in the vehicle 1 which are not depicted in more detail.

By way of example, the seat heating can be set, e.g., to a level 2, by means of a switch, not shown, arranged in a vehicle door, wherein a massage program and/or a selection of music can be activated via the on-board computer 6 by operating a rotary pushbutton or a touch-sensitive switch surface.

Each vehicle function F1 to Fn can only be activated individually, wherein activated vehicle functions F1 to Fn are not coordinated with each other in terms of time and content.

By way of example, it is possible for "Active Workout" to be set as the program of a massage M and "Purple Sky" to be set as the theme of the ambient light A.

In order to coordinate activated vehicle functions F1 to Fn in terms of time and content, it is provided that the vehicle functions F1 to Fn are coordinated by means of the on-board computer 6, which represents a control unit, as shown in more detail in FIG. 2.

The individual vehicle functions F1 to Fn are intelligently controlled centrally by means of an application program which is stored in the on-board computer 6.

By means of the on-board computer 6 and/or another suitable control unit, all individual vehicle functions F1 to Fn, in particular their components for executing the respective vehicle function F1 to Fn, are controlled.

By means of the central control of the vehicle functions F1 to Fn, a coordinated design of processes of the individual vehicle functions F1 to Fn is made possible.

For this purpose, a control software SS is implemented on the on-board computer 6, which is connected both to the control element 8, which represents a person-machine interface, and to an audio player 9 of vehicle 1 for the acoustic output A1.

The on-board computer 6 is coupled to a bus system 10 of the vehicle 1, in particular a CAN bus, for controlling the individual vehicle functions F1 to Fn.

Due to the central control of the vehicle functions F1 to Fn by means of the on-board computer 6, a behavior, in particular a process, of the individual vehicle functions F1 to Fn can be coordinated in terms of time and content, whereby an overall atmosphere is generated for the vehicle user and other occupants of the vehicle 1.

By way of example, inflatable seat bubbles, which are used for the vehicle function F1 to Fn massage M, are controlled simultaneously in time with the played music.

It is also conceivable that a sound, i.e., in particular the acoustic output A1, is transferred via sound converters, so-called exciters, into mechanical movement, for example of the vehicle seat 2, and thus becomes a physical sound experience. This vehicle function F1 to Fn is known as 4D sound.

Alternatively or additionally, it may be provided that the ambient light A is adapted to an animation running on a display unit 7 depending on a background color.

In turn, alternatively or additionally, an air blast is generated by means of a blower of an air conditioning system of vehicle 1, resulting in a movement of at least one element depicted on a display unit 7. This can create the impression that the movement of the element results from the air blast.

One embodiment provides that an animation depicted on the display unit 7 moves depending on the speed of music playing, whereby a harmonious impression between the display unit 7 and the music is created.

Furthermore, it is provided that the scenting B of the interior of vehicle 1 is activated in the case of flowers being depicted on the display unit 7.

Due to the intelligent and coordinated interaction of the vehicle functions F1 to Fn, the vehicle user in particular is offered a maximum possible added value of the vehicle functions F1 to Fn integrated in the vehicle 1. The combinations depicted above are not an exhaustive list but serve to illustrate the general idea.

On one hand, different combinations of vehicle functions F1 to Fn can create different atmospheres in the interior of vehicle 1, which can increase the well-being and/or the attention of the vehicle user. For this purpose, the vehicle user can select a desired user menu and thus a corresponding atmosphere.

On the other hand, a corresponding atmosphere can be created, such that the vehicle user and other occupants can enjoy the overall experience in the interior of vehicle 1.

If, for example, the user menu "Activation" is selected, the vehicle functions F1 to Fn acoustic output A1, optical output A2, scenting B, ionization I, ambient light A, seat ventilation S, the 4D sound and a moving vehicle seat 2, motion seating, are activated and their processes are coordinated in terms of time and content.

For each user menu, leading functions from the number of vehicle functions F1 to Fn, so-called Lead Functions, are predetermined. In the user menu "activation", for example, the Lead Function is the acoustic output A1, wherein all other vehicle functions F1 to Fn assigned to the user menu are adjusted in relation to the lead function.

In the "Refreshment" user menu, the lead function is in particular the air conditioning K.

The invention claimed is:

1. A method for controlling vehicle functions for increasing a sense of well-being and/or for increasing attention of a vehicle user in a vehicle, comprising:
    selecting a user menu by the vehicle user operating an operating element that is coupled to an on-board computer;
    wherein when selecting the user menu, a lead function assigned to the user menu is predetermined from the plurality of vehicle functions and a respective time and content of another vehicle function of the plurality of vehicle functions assigned to the user menu are coordinated with respect to the lead function by the on-board computer; and
    activating the lead function and the another vehicle function to increase the sense of well-being and/or to increase the attention of the vehicle user.

2. The method according to claim 1, wherein the plurality of vehicle functions include ionization, scenting, seat ventilation, massage, air conditioning, seat heating, ambient light, acoustic output, optical output, and a sound-dependent movement of a partial region of a vehicle seat.

3. The method according to claim 1, wherein a seat bubble integrated into a vehicle seat is controlled for a massage function in time with music played simultaneously.

4. The method according to claim 1, wherein an ambient light is controlled depending on a background color of an animation running on a display unit.

5. The method according to claim 1, wherein an air blast is generated by a blower, whereupon an element depicted on a display unit appears to move.

6. The method according to claim 1, wherein a speed of movement of an animation depicted on a display unit is set depending on a speed of music played.

7. The method according to claim 1, wherein, in a case of flowers being depicted on a display unit, a scenting is activated.

8. The method according to claim 1, wherein a relaxing and calming user menu and a stimulating and activating user menu are offered as a selectable user menu.

9. A device for carrying out the method according to claim 1, comprising:
    an operating element coupled to an on-board computer for selecting a specific user menu, wherein, via operation of the operating element, a plurality of activated vehicle functions are coordinated with one another in terms of time and content.

10. A vehicle comprising the device according to claim 9.

* * * * *